Figure 1:
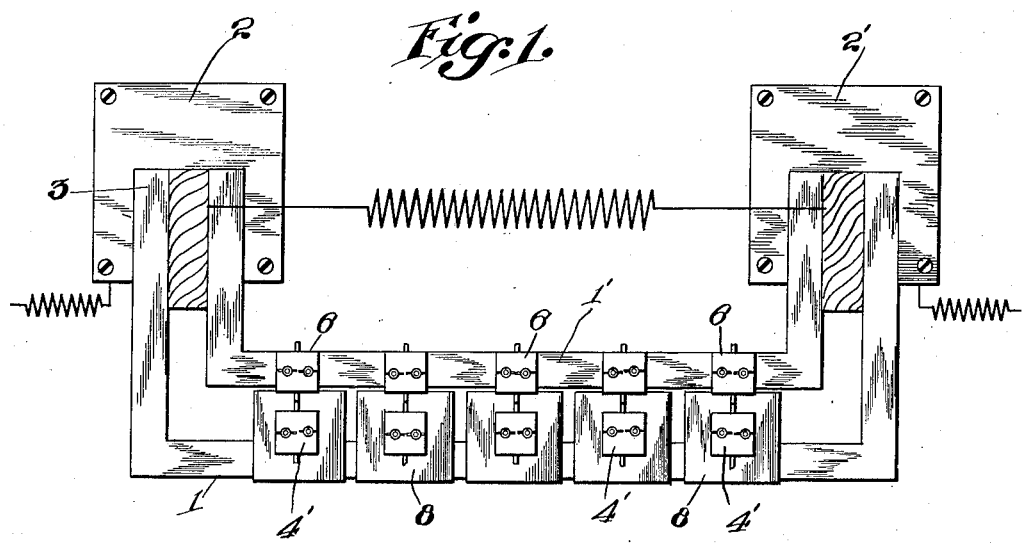

E. THOMSON.
ELECTRIC METAL WORKING APPARATUS.
APPLICATION FILED APR. 27, 1911.

1,012,934.

Patented Dec. 26, 1911.
2 SHEETS—SHEET 1.

WITNESSES:

INVENTOR
ELIHU THOMSON
BY
ATTORNEYS

E. THOMSON.
ELECTRIC METAL WORKING APPARATUS.
APPLICATION FILED APR. 27, 1911.
1,012,934.
Patented Dec. 26, 1911.
2 SHEETS—SHEET 2.
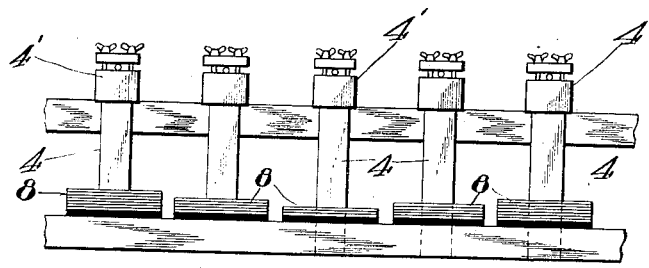
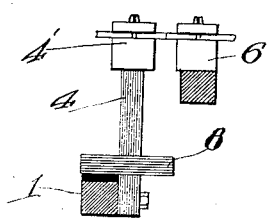
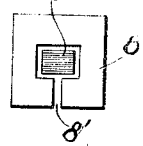
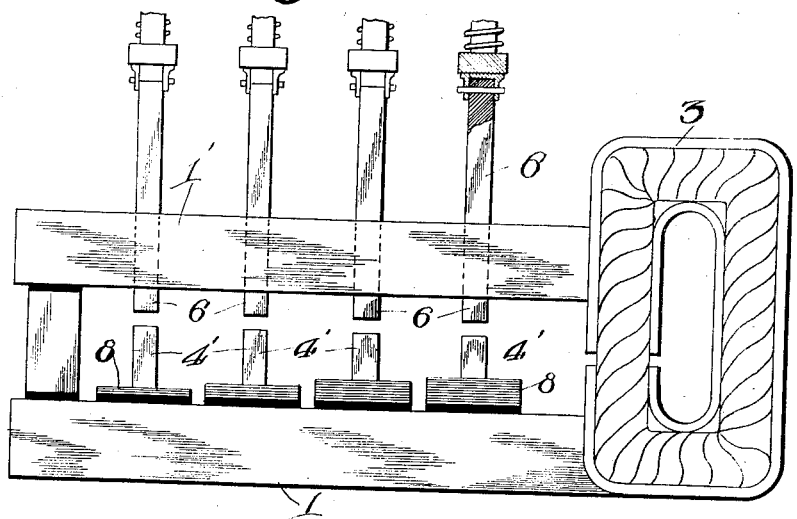
WITNESSES:
Irene Lefkowitz
F. B. Townsend
INVENTOR
ELIHU THOMSON.
BY
Townend & Decker
ATTORNEYS

UNITED STATES PATENT OFFICE.

ELIHU THOMSON, OF SWAMPSCOTT, MASSACHUSETTS, ASSIGNOR TO THOMSON ELECTRIC WELDING COMPANY, OF LYNN, MASSACHUSETTS, A CORPORATION OF MASSACHUSETTS.

ELECTRIC METAL-WORKING APPARATUS.

1,012,934.     Specification of Letters Patent.     Patented Dec. 26, 1911.

Application filed April 27, 1911. Serial No. 623,573.

*To all whom it may concern:*

Be it known that I, ELIHU THOMSON, a citizen of the United States, and a resident of Swampscott, in the county of Essex and State of Massachusetts, have invented certain new and useful Improvements in Electric Metal-Working Apparatus, of which the following is a specification.

My invention relates to that class of electric metal working apparatus in which the metal is softened or brought to the desired degree of plasticity for the welding or other metal working operation by an electric current applied thereto by suitable welding jaws or welding electrodes or other devices constituting electrodes through which heating current is supplied to the section of work to be heated, suitable means being employed for applying pressure to the heated work or otherwise operating upon it mechanically and also, if desired, for supporting or holding the work on or independently of the electrodes.

My invention relates particularly to those forms of electric metal working apparatus in which two or more electrodes are fed with the heating current from a common supply bar of conducting material charged with energy by attachment of any portion of its length to a suitable source of electromotive force. The invention is particularly useful for machines in which the said supply bar forms a terminal of the heavy copper bar or block constituting the secondary of a potential reducing transformer in a manner well-known in the art. I do not however limit myself to a current of any particular form.

The object of my invention is to permit the different electrodes supplying respectively the energy to different pieces of work to feed the same amount of current to all the pieces or different amounts of adjusted values adjusted to the particular amount of current desired in each piece of work irrespective of the position of the electrode upon the current feed bar.

To these ends my invention consists, generally stated, in providing the current supplying bar with arms which carry at their terminations the respective work-engaging electrodes and which arms individually have adjusted values of resistance or opposition to the flow of current in them, as will be more particularly hereinafter described.

In the acompanying drawings, Figure 1 is a plan of a form of apparatus embodying my invention. Fig. 2 is an elevation of the bar and arms. Fig. 3 is a cross-section through the longitudinal bars Fig. 1. Fig. 4 is a cross-section through one of the arms and shows the preferred form of the laminated magnetic circuit surrounding said arm to give it inductance. Fig. 5 illustrates a modification of the arms extending from the current supply bar.

1 indicates a heavy bar or rod of copper or other good conducting material forming a terminal of a suitable source of electric energy which is fed thereto by attachment of the source at any portion of the length of the bar.

In the form of my invention illustrated in Fig. 1, said bar is supplied from either or both ends with alternating currents from the secondary of the transformer or transformers 2, 2', and for convenience and to secure rigidity in the machine, said bar forms in effect an extension of the heavy copper secondary bar 3. Opposite said bar 1 and in the desired relation thereto for supporting or feeding currents to the opposite side of the work is another bar 1' which is fed from the other terminal or terminals of the secondary bars of the transformers 2, 2'. From the bar 1 extend arms 4 of any desired number, each of which carries or is connected at its terminal to a head or block 4' forming or carrying the electrode which applies current to the work and which head may also afford means for attachment of the devices which clamp the work, or may be itself a welding electrode, as well understood in the art. The arms 4 may be so constructed as to be flexible, thus permitting the heads to be freely moved for the purpose of applying pressure to the work and at the same time dispensing with any sliding connection between the feed bar and the work. I prefer to construct the arms from laminations of copper assembled in a pile or bundle. Movement may be imparted to the heads simultaneously or dissimultaneously by any desired means, as well understood in the art. The complementary heads or electrodes carried by the opposite feed bar 1' are marked 6 and may be attached to or form an integral part of the bar 1', which in many commercial utilizations of my invention would be a cast copper bar having the heads or parts 6 cast integrally with it. Said heads may carry devices for clamping the work and supplying current thereto and constitute the opposite electrodes of the apparatus, there being as many of said heads 6 as there are heads 4' and each opposed pair serving to supply current to a different piece or portion of work for heating the same. The heads 6 might, however, as indicated in Fig. 5, be simply movable electrodes, moving in guides on the bar 1' and operated by any suitable mechanism, together or in any desired sequence. To permit the desired amount of current to be delivered to each piece or portion of the work, I give to each arm 4 a resistance or inductance depending upon the character of the current employed, said resistance or inductance being adjusted in value to the amount of current desired, thereby making it possible to supply to each piece or portion of work current of a value independent of the position of each arm or of its corresponding electrode on the feed bar 1 and independent of its distance from the point of attachment or connection of said current supply bar to the current supply. In the case of alternating currents, the resistance or opposition to the flow of current in each arm and to each electrode is conveniently secured by surrounding the arm with laminated iron 8, the amount of which as determined by the number of plates in each pile or otherwise, will depend in each case upon the amount of current desired between each pair of electrodes or heads 4', 6. Preferably each magnetic circuit has an air gap as at 8', the effect of which is to steady the current in each arm and obtain a practically constant current therein. The value of the different inductances is shown as roughly accommodated to the differences in distance of the arms from the ends of the supply bar 1. Inasmuch as the current is fed into the bar from the ends, as shown, the middle arm 4 is provided with less inductance, since the potential of said arm at its point of connection with the bar 1 is less than that of the arms nearer the ends of the bar. This would be roughly an adjustment of inductances designed to give practically the same current values the same between the various pairs of electrodes or heads 4', 6. It is not necessary, therefore, that the current feed bar should be supplied from both ends since it might be supplied from one end only as indicated in Fig. 5 and in that case the value of the inductances might decrease progresssively from one end to the other, in order that inductance or resistance to flow of current in the arm nearest the point of attachment to the source should be greater and that more remote should be less, and in a degree to practically equalize the flow of current through all the arms. Or the inductances might have any other relation of values to one another as desired or so as to secure different values of heating current in the different pieces or portions of work. I do not, therefore, limit myself to providing inductances of values adjusted to give currents of the same value in all of the arms but may apply the inductances to any desired amount and to give any required or desired amount of heating current at each piece or portion of work.

Obviously my invention does not depend upon the order of operation of the welding devices or application of the heating effects, since the apparatus may be operated to heat the pieces or portions of work and apply pressure either simultaneously or dissimultaneously and in any desired order or number.

In the modification of my invention shown in Fig. 5 the several arms are shown as solid arms or projections not having flexibility and said arms may be cast upon the bar 1 if desired and in one piece therewith, as shown. Each said bar would, however, as before, be provided with the desired and adjusted amount of inductance in proportion to the current required on each piece or portion of the work. The said arms are here shown as themselves constituting one of a pair of welding jaws or electrodes, the opposite members of each pair being mounted upon and receiving current from the opposite bar 1', so that the work will be compressed between said members and will, at the same time, be fed with current therefrom. The opposite members 6 in this instance are the movable electrodes which are actuated by any desired means known in the art, either simultaneously or in any desired sequence.

What I claim as my invention is:

1. In an apparatus of the character described, a current supplying bar provided with arms terminating in electrodes for different pieces or portions of work, said arms having values of inductance adjusted to distribute the current to the work in the desired proportions.

2. In an apparatus of the character described, a current supplying bar to which are attached work supply electrodes fed with currents from said bar adjusted in value with reference to the position of the electrode on the bar.

3. In an apparatus of the character described, a current supply bar having arms carrying at their terminals means for feeding current to the work, said arms being provided with means for opposing the flow of current to the terminals and in proportions adjusted with reference to the position of the arms on the bar and the amount of current desired in each piece or portion of work.

4. In an electric metal working apparatus, the combination with a current supply bar, of a series of current supplying blocks or heads deriving current from said bar and connected thereto at different points along its longitudinal axis and means for adjusting the supply of current to each head with reference to its position on the bar and the current required for the particular piece or portion of work supplied from each head.

5. In an electric metal working apparatus, the combination with a series of current carrying heads and a current supply bar therefor, of projections from the bar connecting the same with the heads and laminated iron applied around the projections as and for the purpose described.

6. In an electric metal working apparatus, the combination of a pair of current supply bars and a pair of transformers whose opposite terminals are connected to the ends of said bars respectively, current supplying heads each forming the termination of a projection or arm from one of said bars and laminated iron on said arms as and for the purpose described.

7. In an electric metal working apparatus, the combination of a pair of current supply bars provided with a series of electrodes having inductances of adjusted value, adjusted with relation to the amount of current desired in each piece or portion of the work.

8. In an electric metal working apparatus, the combination of an alternating current supply bar, a series of current supplying electrodes or heads mounted on arms projecting therefrom, said arms being provided with a mass of iron provided with an air gap as and for the purpose described.

9. In an electric metal working apparatus, a current supply bar having a lateral projection terminating in a work supplying head or electrode and a mass of laminated iron surrounding said projection and provided with an air gap as and for the purpose described.

10. In an apparatus of the character described, a current feed bar extending from a terminal of a transformer secondary and provided with a plurality of flexible arms projecting laterally therefrom and having welding electrodes at their free ends.

11. In an apparatus of the character described, an alternating current feed bar forming a terminal of a transformer secondary and flexible arms projecting laterally therefrom and provided with inductance.

Signed at Lynn in the county of Essex and State of Massachusetts this 24th day of April A. D. 1911.

ELIHU THOMSON.

Witnesses:
JOHN A. McMANUS, Jr.
CHARLES A. BARNARD.